United States Patent Office 3,345,245
Patented Oct. 3, 1967

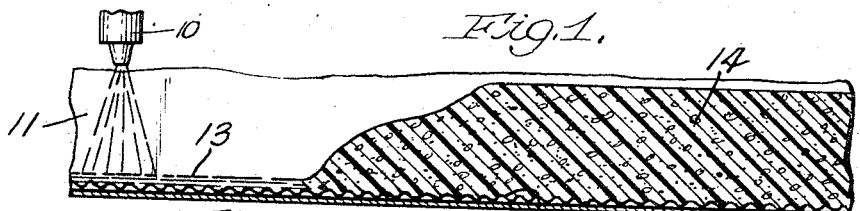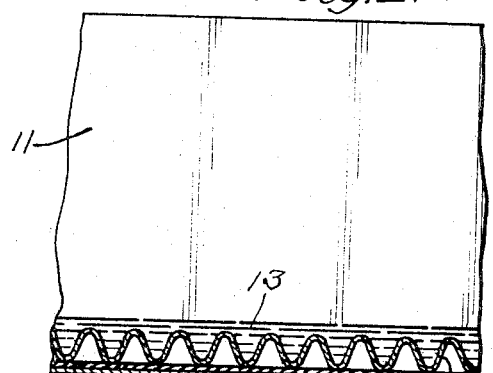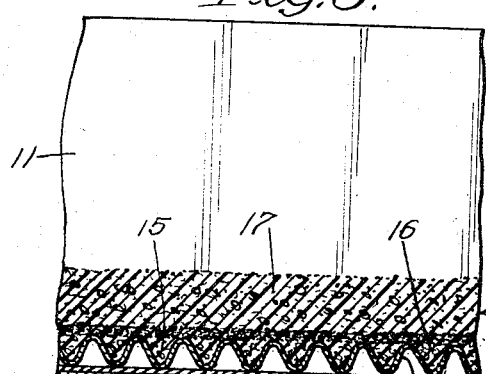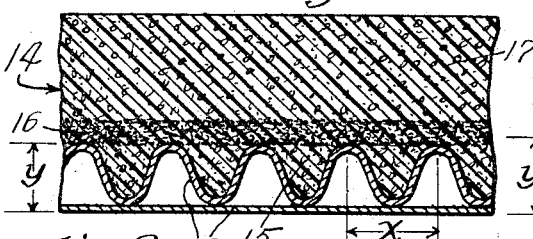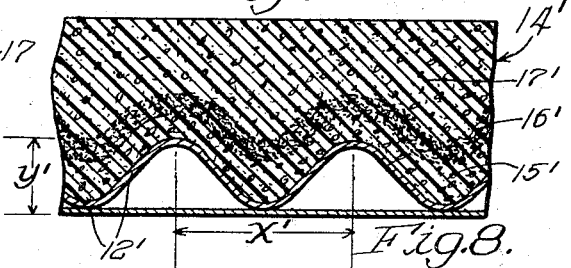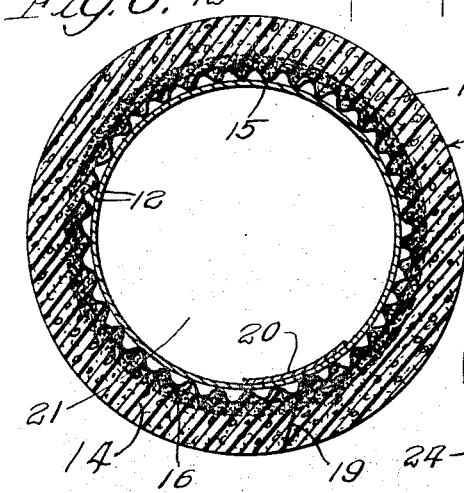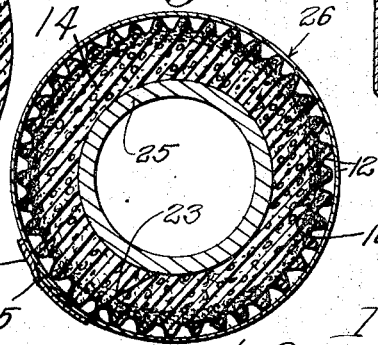

3,345,245
COMPOSITE STRUCTURE HAVING SHOCK
ABSORBING PROPERTIES
Helmut George Hanusa, Waukegan, Ill., assignor, by
mesne assignments, to Stauffer Chemical Company,
New York, N.Y., a corporation of Delaware
Filed Sept. 26, 1960, Ser. No. 58,493
6 Claims. (Cl. 161—119)

This invention relates to a composite structure comprising a non-foamed base with an irregular surface and relatively resilient foamed or cellular polyurethane having varying densities adhering in direct interface contact with the irregular surface of the base. More specifically, it relates to a composite structure comprising a relatively non-resilient base of non-foamed sheet material with an irregular or undulating surface and integral, relatively resilient cellular polyurethane adhering in direct interface contact with the irregular surface of the base, wherein the cellular polyurethane has layers of relatively low density polyurethane, relatively high density polyurethane, and intermediate density polyurethane extending in that sequence outwardly from the interface contact of said base and cellular polyurethane.

Cellular polyurethane is generally made by ejecting the liquid reaction mixture from a mixing chamber into a metal mold, shortly after which cellular polyurethane is formed therein. The resulting foamed polyurethane has a relatively dense and tough skin that is formed on all the surfaces of the polyurethane that are in contact with the mold as well as the upper surface that is exposed to air. Because of the generally unsightly appearance of the skin and its essentially non-cellular characteristics, it is common practice to remove it from the cellular polyurethane. This operation is wasteful, time-consuming and adds to the cost of manufacturing the final product.

Further, when cellular polyurethane is used for forming packages or for purposes of insulation, the cellular polyurethane is glued to corrugated paper base or the like. However, the cellular polyurethane does not directly adhere to the valleys of the corrugated base. Still further, if the skin is removed from the surface of the cellular polyurethane that contacts the base, the resulting composite structure includes cellular polyurethane that has substantially uniform density throughout its thickness. If the skin is not removed from this surface, it is increasingly difficult to insert the cellular polyurethane within the valleys of the base and the resulting structure has undesirable shock absorption characteristics for some purposes.

I have discovered a method of producing a new product wherein the cellular polyurethane can be made to directly adhere in interfacial contact with substantially the entire irregular surface of the base in a single operation that does not require the use of an adhesive or the removal of skin from the surface of the cellular polyurethane that contacts the base.

Still further, my new composite structure has layers of relatively low density polyurethane, relatively high density polyurethane, and intermediate density polyurethane that extend in that sequence outwardly from the interface contact of the base and cellular polyurethane. I have found that this sequence of varying densities enables the polyurethane to have outstanding shock absorption characteristics that make the composite material particularly well suited for packaging purposes and provides a product that has outstanding temperature and sound insulation properties.

The base must be constructed of material that enables the cellular polyurethane to directly adhere to its irregular surface without an adhesive while the liquid polyurethane reaction mixture is being foamed in place. The base may comprise a non-foamed relatively non-resilient sheet having an undulating or irregular surface. This sheet material may be constructed of paper (i.e., sheet material made from fibrous material such as wood pulp, straw, waste papers, vegetable fiber, and the like), metal such as aluminum, or non-porous plastic material such as a polyester resin that is reinforced with glass fibers. The base of the sheet material may be bent into an undulating, fluted or corrugated configuration such as shown in the accompanying drawings, and may include sheets that have been creased or scored with a "waffle" or "checkerboard" pattern.

It is known that cellular polyurethane may be made from reaction products of polymeric materials with reactive hydroxyl groups or hydrogen atoms, such as linear or branched polyesters, with polyisocyanates, by using blowing agents or reacting these products with water or compounds (e.g., the polyester may contain both reactive terminal hydroxyl and carboxyl groups) containing reactive COOH groups.

For example, cellular polyurethane may be produced by reacting a polyester component containing a polyester resin (e.g., condensation product of polyhydric alcohol and polycarboxylic acid), water, catalyst, and preferably, an emulsifier with a diisocyanate component. Cellular polyurethane may also be produced by reacting a polyester resin with a sufficient amount of diisocyanate so as to make a prepolymer containing unreacted NCO groups; the prepolymer may then be reacted with water or a water-catalyst mix to produce a cellular reaction product.

The polyester resin may be the reaction product of a polyhydric alcohol and polybasic acid, unmodified or modified with oil and/or other resins, and the like. For example, a suitable polyester resin may be produced by reacting saturated acids such as adipic acid with diethylene glycol and trimethylol ethane. Unsaturated dibasic acids could be wholly or partially substituted for the saturated acid, but tend to produce a polyurethane foam that possesses comparatively less durability on aging.

The polymeric material may consist of or include a polyether or a natural polyester such as castor oil. In using the polyether, a prepolymer of the polyether and diisocyanate could also be used.

Insoluble, inert additives such as hydrated silica pigment or ferric oxide may be incorporated into the polymeric-isocyanate mix in order to produce cellular polyurethane having uniform cells of the desired size.

Polyisocyanates, such as tolylene diisocyanate, may be used in forming the cellular polyurethane.

The liquid, foamable polymeric-diisocyanate mix may be formed in and ejected from a mixing device such as described in U.S. Patent 2,764,565, and the composition of Example 2 of that patent may be used.

In the accompanying diagrammatic drawings:

FIGURE 1 is a fragmentary sectional view through the length of the mold showing the movable mixer ejecting a liquid, foamable polyurethane reaction mixture into a metal mold having a corrugated paper base at the bottom thereof;

FIGURE 2 is an enlarged fragmentary view of FIGURE 1 showing the bottom of the mold, the mixture, the corrugated base at the bottom of the mold, and the liquid reaction mixture;

FIGURE 3 is an enlarged fragmentary view similar to FIGURE 2 after the liquid reaction mixture shown in FIGURES 1 and 2 has formed into solid cellular polyurethane. This figure shows that the cellular polyurethane has layers having different densities;

FIGURE 4 is an enlarged fragmentary view of FIGURE 3 after the cellular polyurethane is removed from the mold and shows the distance between crests of the cellular polyurethane ridges and the height of the ridges;

FIGURE 5 is a fragmentary view similar to FIGURE 4 showing a composite structure comprising a cellular polyurethane sheet and a corrugated base, wherein the distance between the crests and the height of the polyurethane are greater than those shown in FIGURE 4;

FIGURE 6 is a sectional view of an elongated cylindrical structure with a continuous elongated passageway therein made of the material shown in FIGURE 4, and shows the base on the inside and a surrounding sheet of cellular polyurethane;

FIGURE 7 is a sectional view of an elongated tubular structure constructed of the composite material shown in FIGURE 4 wrapped about a metal pipe, and shows the base surrounding the cellular polyurethane, which, in turn, surrounds the pipe; and FIGURE 8 is a package comprising a container having an article embedded therein by a sheet of the composite material shown in FIGURE 4.

Referring to FIGURE 1, which illustrates the first step in making my composite structure, the oscillating mixer 10, such as shown in Patent 2,764,565, oscillates across the width of the aluminum mold 11 and ejects a foamable, liquid polyurethane reaction mixture 13, of the type shown in Example 2 of that patent, directly over the corrugated, relatively non-resilient paper base 12 that is positioned at the bottom of the mold 11 and the mold moves longitudinally (to the right in FIGURE 1) also as shown in that patent. The mold of FIGURE 1 slopes downwardly along its length so that the liquid reaction mixture can cover the bottom of the mold. The corrugated paper base 12 shown in the drawings is the conventional corrugated paper sheet material that is used in packaging fragile articles. Since the corrugated base 12 completely covers the bottom of the mold 11, the liquid reaction mixture covers the upper surface only of the base, as shown in FIGURES 1 and 2.

The liquid reaction mixture 13 then reacts in the mold 11 and foams up at atmospheric pressure and room temperature to form a composite structure 14 having an integral sheet of solid cellular polyurethane that adheres directly to the upper undulating or fluted surface of the base 12 without requiring the use of an adhesive.

It is important that the base 12 be positioned at the bottom of the mold 11, although, if desired, corrugated sheet material may also be positioned along the sides of the mold 11. The weight of the reaction mixture 13 upon the base 12 enables the integral, solid cellular polyurethane sheet to adhere directly to the low surfaces (valleys) as well as the high surfaces (crests) of the corrugated base 12. Further, when the liquid reaction mixture 13 reacts to form the solid cellular polyurethane structure, the polyurethane does not shrink upwardly from the base 12, although some shrinkage does occur downwardly from the top and inwardly from the sides.

FIGURE 3 shows the integral cellular polyurethane sheet in direct, adhering interface contact with the valleys as well as the crests (highest points of the undulating wave structure) of the base 12. FIGURE 3 further shows that the integral cellular polyurethane sheet has three layers of varying densities. The lower layer of cellular polyurethane within the valleys of the corrugated sheet 12 is formed of relatively low density ridges 15 that extend upwardly to a flat continuous layer 16 of relatively high density cellular polyurethane. The relatively high density layer 16, in turn, extends upwardly to a flat continuous layer 17 of cellular polyurethane of relatively intermediate density.

FIGURE 4 shows in greater detail the composite structure 14 comprising the base 12 and integral, solid cellular polyurethane sheet after this structure is removed from the mold 11 shown in FIGURE 3.

The composite structure 14, as shown in FIGURE 4, may be made, for example, when the corrugations of the base 12 has a height $y$ of about 3/16 inch and when the distance $x$ between the crests of the base is about 3/16 inch.

The combination of relatively low density cellular polyurethane 15, the layer 16 of relatively high density cellular polyurethane, and the layer 17 of intermediate density cellular polyurethane provide an integral cellular polyurethane sheet that, in conjunction with the base, such as 12, forms a composite structure 14 that has outstanding shock and impact absorbing characteristics.

I have found that the best shock absorbing characteristics are obtained when the height $y$ of the cellular polyurethane ridges does not exceed about 3/4 inch and the distance $x$ between the crests of the polyurethane ridges does not exceed about 1/2 inch. I prefer that the distances $x$ and $y$ do not exceed about 1/2 inch.

When the height $y$ and distance $x$ exceed certain values, the layers of cellular polyurethane assume a corrugated or fluted shape such as shown in FIGURE 5.

More specifically, FIGURE 5 shows a composite structure 14' having a corrugated paper base 12' and an undulating relatively low density layer 15' of polyurethane in direct, adhering interface contact with the base 12', and shows the undulating layers 16' and 17' of relatively high and relatively intermediate density cellular polyurethane, respectively, extending upwardly from the lower layer 15'.

The composite structure 14' shown in FIGURE 5 may be formed, for example, when the distances $x'$ (distance between crests of the base) and $y'$ (height of crests of the base) are each 1 inch.

The wave-like form of the layer 16' of structure 14' provides the composite structure with a relatively high density layer having a spring-like shape, which renders the composite structure less desirable for many packaging purposes than a flat layer 16 of relatively high density polyurethane as shown in FIGURE 4.

I have found that with special fast reacting liquid, foamable polyurethane reaction mixtures, I can use the base 12 and form a composite sheet that does not have a high density layer such as 16. However, the composite product will have a wavy low density layer and a wavy layer of intermediate density polyurethane having the general configuration of FIGURE 5 if layer 16' were omitted.

The above referred to composite structure may also be used as conduits, as well as for sound and temperature insulation.

FIGURE 6 shows the composite structure 14 shown in FIGURE 4 formed into an elongated, hollow cylindrical pipe or conduit structure 22 having a continuous, elongated cylindrical passageway 21 therein. This structure 22 may be used as air conduits and for similar purposes. The cylindrical passageway 21 of the conduit 22 is defined by the smooth surface of the relatively non-resilient base 12 of sheet material. The integral sheet of cellular polyurethane is in interface adhering contact with the undulating surface of the base 12 and extends outwardly thereof. The cellular polyurethane has a layer of relatively low density polyurethane ridges 15, a layer 16 of relatively high density polyurethane, and a layer 17 of intermediate density polyurethane extending in that sequence outwardly from the interface contact of the base 12 and cellular polyurethane sheet.

The composite structure 14 of conduit 22 has beveled side edges that abut along the plane 19. These abutting side edges are secured to each other by means of adhesive tape 20. The laterally extending tape 20 is placed at spaced intervals along the smooth surface of the base 12 and connects the abutting edges of the base.

If desired, a continuous longitudinally extending strip of adhesive tape may be placed on the smooth side of the base 12 along the seam formed by the abutting side edges of the base 12, or the abutting side edges of the layer 17 of cellular polyurethane may be secured to each other by tape or other connecting means.

FIGURE 7 shows the composite material 14 formed into an elongated, tubular structure 26 that is wrapped about a metal pipe 25 in order to insulate the pipe. Unlike the conduit 22 shown in FIGURE 6, the structure 26 of FIGURE 7 serves to insulate the conduit or pipe 25.

In the structure shown in FIGURE 7, the base 12 encircles the polyurethane sheet, which, in turn, encircles and contacts the pipe 25.

The side edges of the composite structure 14 are beveled and abut each other along the plane 23. The abutting side edges of the base 12 are secured to each other by placing strips of laterally extending adhesive tape 24 thereon at spaced intervals. If desired, the side edges may be joined by staples.

FIGURE 8 shows a package 29 comprising a container having a fragile article 27 embedded therein by a sheet of the composite material 14 shown in FIGURE 4.

Although the above referred to drawings specifically show a base formed of paper, other material may be used. For example, corrugated aluminum foil may be used. However, it is important that the material that is selected for forming the base provides an undulating, fluted or corrugated surface that enables the liquid, foamable cellular polyurethane reaction mixture to foam in place with the base and directly adhere to the irregular surface of the base without requiring the use of an added adhesive.

The foregoing detailed description has been given for clearness of understanding only, and no unnecessary limitations should be understood therefrom, as modifications will be obvious to those skilled in the art.

I claim:

1. A composite structure having shock absorbing properties comprising: a base of a relatively non-resilient corrugated sheet having substantially its entire corrugated surface in direct, adhering interfacial contact with an integral sheet of relatively resilient foamed in place cellular polyurethane; said polyurethane having distinct, stratified layers of varying densities, the polyurethane within the valleys of the corrugated sheet being relatively low density ridges that extend from the base sheet to an uninterrupted layer of relatively high density polyurethane, which in turn extends to a layer of polyurethane having relatively intermediate density; the height of the polyurethane ridges at said interfacial contact being not more than about ¾ inch and the distance between polyurethane crests at said interfacial contact being not more than about ½ inch.

2. The structure of claim 1 wherein the base is corrugated paper material.

3. The structure of claim 1 wherein the base is corrugated metal.

4. The structure of claim 1 wherein the base is corrugated plastic material.

5. The structure of claim 1 wherein the relatively high density layer of polyurethane is substantially flat.

6. The structure of claim 1 wherein the height of said polyurethane ridges is at least equal to the distance between said crests.

References Cited

UNITED STATES PATENTS

| | | | |
|---|---|---|---|
| 2,586,275 | 2/1952 | Toulmin | 18—53 |
| 2,737,503 | 3/1956 | Sprague et al. | 260—3.5 |
| 2,764,565 | 9/1956 | Hoppe et al. | 260—2.5 |
| 2,805,972 | 9/1957 | Cross et al. | 154—45 |
| 2,841,205 | 7/1958 | Bird | 18—11 |
| 2,866,730 | 12/1958 | Potchen et al. | |
| 2,895,603 | 7/1959 | Freeman | 206—46 |
| 2,961,332 | 11/1960 | Nairn | 156—78 |
| 2,973,295 | 2/1961 | Rodgers | 154—100 |
| 2,983,636 | 5/1961 | Runton | 154—52.1 |

FOREIGN PATENTS 193,598  2/1957  Austria.

MORRIS SUSSMAN, *Primary Examiner.*

CARL F. KRAFFT, EARL M. BERGERT, *Examiners.*

H. L. GATEWOOD, *Assistant Examiner.*